(12) United States Patent
Rogalla

(10) Patent No.: US 9,714,881 B2
(45) Date of Patent: Jul. 25, 2017

(54) METHOD AND DEVICE FOR DETERMINING A MACHINING AXIS

(71) Applicant: Schenck RoTec GmbH, Darmstadt (DE)

(72) Inventor: Martin Rogalla, Darmstadt (DE)

(73) Assignee: Schenck RoTec GmbH, Darmstadt (DE)

( * ) Notice: Subject to any disclaimer, the term of this patent is extended or adjusted under 35 U.S.C. 154(b) by 188 days.

(21) Appl. No.: 14/655,071

(22) PCT Filed: Jan. 27, 2014

(86) PCT No.: PCT/EP2014/051488
§ 371 (c)(1),
(2) Date: Jun. 24, 2015

(87) PCT Pub. No.: WO2014/118115
PCT Pub. Date: Aug. 7, 2014

(65) Prior Publication Data
US 2015/0346048 A1    Dec. 3, 2015

(30) Foreign Application Priority Data

Jan. 29, 2013 (DE) .......................... 10 2013 100 899
Oct. 16, 2013 (EP) ...................................... 13188929

(51) Int. Cl.
*G01B 11/14* (2006.01)
*G01M 1/30* (2006.01)
(Continued)

(52) U.S. Cl.
CPC ............... *G01M 1/14* (2013.01); *G01B 11/14* (2013.01); *G01B 11/272* (2013.01); *G01M 1/30* (2013.01)

(58) Field of Classification Search
CPC ...... G01M 1/14; G01M 11/14; G01M 11/272; G01M 1/30
(Continued)

(56) References Cited

U.S. PATENT DOCUMENTS 3,905,116 A * 9/1975 Roberts ..................... G01B 5/02
33/555
4,060,003 A * 11/1977 Bacsanyi .............. G01M 1/045
73/483

(Continued)

FOREIGN PATENT DOCUMENTS

DE    28 23 219 C2    11/1979
EP    0 268 724 B1    3/1989
(Continued)

OTHER PUBLICATIONS

International Search Report of PCT/EP2014/051488, mailed Jun. 17, 2014.

*Primary Examiner* — J M Saint Surin
(74) *Attorney, Agent, or Firm* — Collard & Roe, P.C.

(57) ABSTRACT

In order to determine the machining axis of a rotatable workpiece blank, a reference workpiece, which has bearing surfaces concentric to its imbalance reference axis, and subsequently a workpiece blank are received in a measurement device, and as yet unmachined surface regions of the reference workpiece and of the workpiece blank are measured by a sensor device, and the measured position data are stored by a computer as a reference partial surface and a blank partial surface in a data storage device. The computer calculates deviations between the blank partial surface and the reference partial surface and, from these, an imbalance effect which is expressed by the position of the main axis of inertia of a given workpiece. The machining axis is calculated by adding an offset to the position of the main axis of inertia, which offset has been empirically determined with (Continued)

Figure 1:
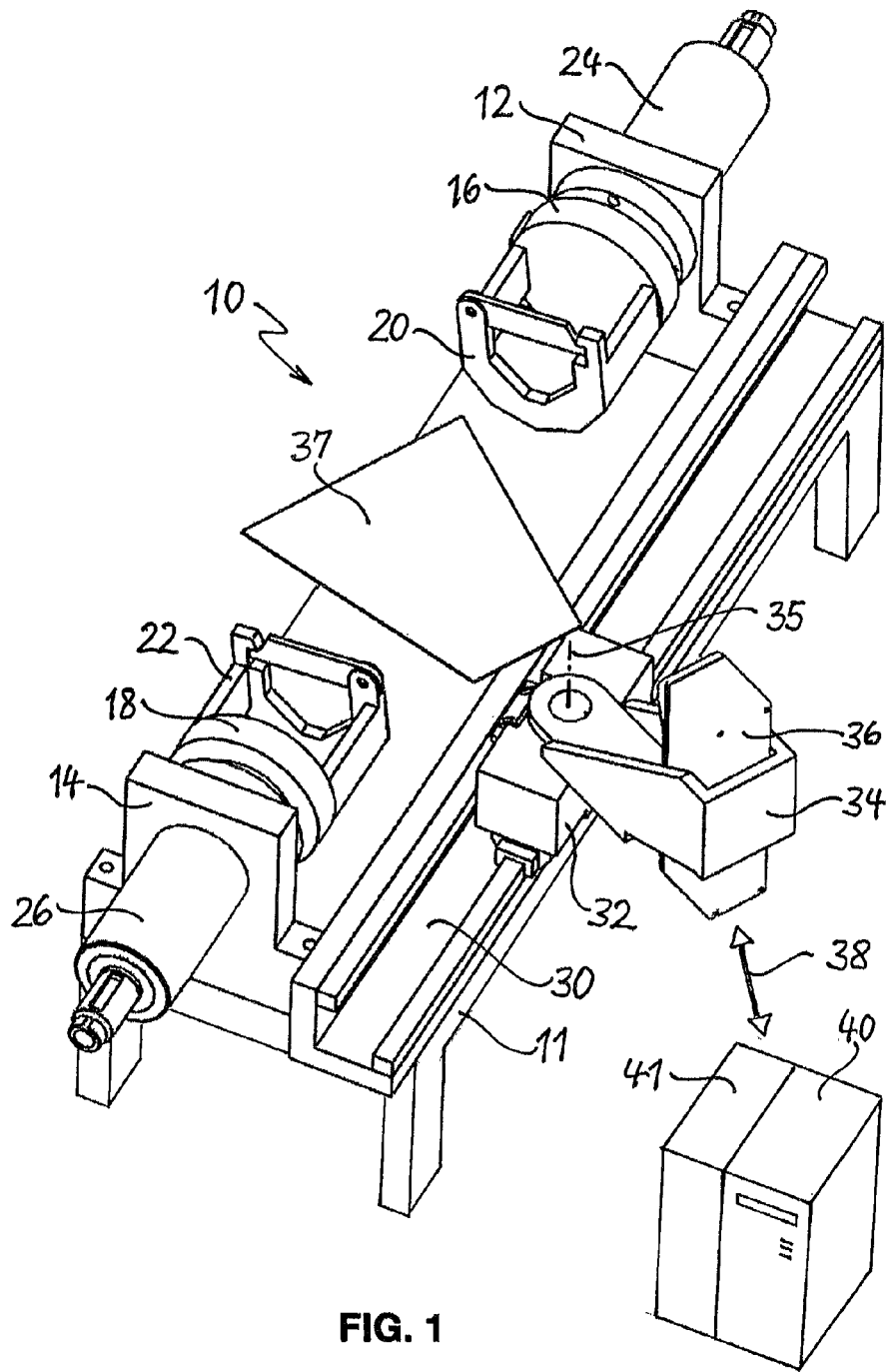

the aid of the actual imbalances of previously produced workpieces measured relative to the machining axis.

19 Claims, 3 Drawing Sheets

(51) Int. Cl.
  *G01M 1/14* (2006.01)
  *G01B 11/27* (2006.01)
(58) Field of Classification Search
  USPC .................................................. 73/487, 66
  See application file for complete search history.

(56) References Cited

U.S. PATENT DOCUMENTS

| | | | | |
|---|---|---|---|---|
| 4,300,197 A * | 11/1981 | Schonfeld | ............... | G01M 1/24 700/279 |
| 4,884,210 A | 11/1989 | Blaimschein | | |
| 5,270,942 A * | 12/1993 | Reed | .......................... | B23B 1/00 700/195 |
| 5,274,566 A * | 12/1993 | Reed | ....................... | G01B 17/00 700/195 |
| 6,397,463 B1 * | 6/2002 | Assie | ......................... | B23B 5/18 29/406 |
| 6,698,095 B1 * | 3/2004 | Assie | ......................... | B23B 5/18 29/406 |
| 6,829,935 B1 * | 12/2004 | Youells | ................... | G01M 1/24 73/1.84 |
| 7,199,873 B2 * | 4/2007 | Braghiroli | ............. | G01M 1/225 356/139.04 |
| 9,120,161 B2 * | 9/2015 | Yoshimoto | .............. | B23B 49/04 |

FOREIGN PATENT DOCUMENTS

| | | |
|---|---|---|
| EP | 2 184 595 A1 | 5/2010 |
| GB | 2 021 736 A | 12/1979 |
| JP | H10-62144 A | 3/1998 |
| JP | 2009-020009 A | 1/2009 |

* cited by examiner

METHOD AND DEVICE FOR DETERMINING A MACHINING AXIS

CROSS REFERENCE TO RELATED APPLICATIONS

This application is the National Stage of PCT/EP2014/051488 filed on Jan. 27, 2014, which claims priority under 35 U.S.C. §119 of German Application No. 10 2013 100 899.2 filed on Jan. 29, 2013, and European Application No. 13188929.7 filed on Oct. 16, 2013, the disclosures of which are incorporated by reference. The international application under PCT article 21 (2) was not published in English.

This invention relates to a method of determining the position for a machining axis of a rotary work blank, in particular a crankshaft, which includes workpiece areas to be machined by stock removal and workpiece areas left unmachined and whose nominal mass distribution is known, by means of a measurement device capable of measuring the spatial position of workpiece surface points.

DE 28 23 219 C2 discloses a method of measuring the position of the mass inertia axis of a workpiece configured to rotate by means of a mass-centering machine. This method includes receiving the workpiece in a machine in an initial position predetermined by its geometrical shape and rotating it about an axis of rotation of the holding fixture. While the workpiece rotates, any imbalance identified is measured, and the position of the mass inertia axis of the workpiece in relation to the given axis of rotation is determined. In a further step, the position of rest of the workpiece is changed such that the given axis of rotation and the mass inertia axis coincide. In this position, centering bores or analogous centering means are applied to the workpiece, which serve to receive the workpiece in the subsequent machining operations.

EP 0 268 724 B1 discloses a method of mass centering workpieces to be machined in part, in particular crankshafts, in which the workpiece, before being machined, is displaced transversally relative to its axis of rotation in the sense of reducing any imbalance and is provided with centering bores defining the balanced centered position. To determine magnitude and direction of the transverse displacement of the workpiece, the unbalances resulting from the workpiece areas to be machined are disregarded, considering only those unbalances that are attributable to the workpiece areas remaining unmachined. The axis of rotation which, as a result of the transverse displacement of the workpiece, is fixed with the centering bores, therefore runs in balancing fashion only in relation to the workpiece portions remaining unmachined. Considering that machining of the workpiece is oriented to the axis of rotation defined by the centering bore, a preliminary balancing function is achieved. In this process, the workpiece areas remaining unmachined are measured in their actual outer shapes by sensors which are directed at individual selected reference points of the workpiece surface, and are inputted in a computer which compares these actual shapes to the target shapes of an ideal workpiece and computes the workpiece displacement in dependence upon the variance between actual and target shapes while also having regard to the machining allowances provided. This known method requires highly complex measurement devices in order to be able to measure the workpiece areas left unmachined to the required accuracy.

Moreover, EP 2 184 595 A1 discloses a method of determining the position of centering bores drilled into a crankshaft, which includes measuring the outer surface of the crankshaft and capturing three-dimensional shape data, assuming, on the basis of such shape data, a position of the centering bore in the crankshaft, simulating, based on the assumption of the position of the centering bore as reference quantity a predetermined machining operation of the crankshaft, and then determining a crankshaft shape corresponding to the simulated machining operation. In a subsequent balance decision step, a check is made to establish whether or not the magnitude of the imbalance of the crankshaft in the shape achieved after the simulated machining operation is within a predetermined allowable range, and a centering bore decision step determines the assumed position of the centering bore as the valid bore position if the imbalance value lies within the permissible range.

It is an object of the present invention to provide a method of the type initially referred to which enables the points of location for defining a machining axis of a work blank to be determined to a degree of accuracy resulting in only a minimum of imbalance of the machined work blank. In addition, the method should allow simple and ready implementation and require no complex and expensive devices for implementation. Short cycle times should be achievable for determining the points of location of work blanks.

It is another object of the present invention to provide an advantageous device for implementing the method.

The object identified is accomplished with regard to the method by the features recited in claim 1. Advantageous further developments of the method are recited in claims 2 to 9.

With regard to the device, the object is accomplished by the features recited in claim 10. Advantageous embodiments of the device are recited in claims 11 to 19.

According to the present invention, the method of determining the position of the end points of location for a machining axis of a rotary work blank which includes workpiece areas to be machined by stock removal and areas to be left unmachined and whose nominal mass distribution is known, by means of a measurement device capable of measuring the spatial position of workpiece surface points, comprises the steps of:

receiving a reference workpiece in the seats of the measurement device;

measuring, by means of the measurement device, the position of a plurality of points of surface areas of the reference workpiece to be left unmachined relative to an imbalance reference axis determined in the measurement device;

storing, in a data memory of a computer, the measured position data of the plurality of points of surface areas of the reference workpiece to be left unmachined as reference partial surface;

removing the reference workpiece from the measurement device and receiving a work blank in the seats of the measurement device;

measuring, by means of the measurement device, the position of a plurality of points of surface areas of the work blank to be left unmachined;

storing, in the data memory of the computer, the measured position data of the plurality of points of surface areas of the work blank to be left unmachined as blank partial surface;

computing, from the stored position data, an imbalance effect relative to the imbalance reference axis which results from the deviation between blank partial surface and reference partial surface;

expressing the imbalance effect by the position of the main inertia axis of an assumed workpiece having nominal mass distribution; and computing the machining axis of the work blank by adding an offset to the position of the main inertia axis.

The offset may be initially assumed as zero value, to be subsequently determined empirically and stored in the computer with reference to imbalances, measured relative to the machined workpiece axis, of a plurality of workpieces manufactured with a machining axis determined according to the method. Preferably, the position of the machining axis may be expressed by the position of points of location which are computed as penetration points of the machining axis through work blank end planes aligned orthogonally to the imbalance reference axis.

The empirically determined offset makes allowance for an imbalance of the reference workpiece relative to the imbalance reference axis determined in the measurement device and changes which the work blank experiences as a result of the subsequent machining operation using the machining axis determined according to the method, counteracting these effects in the sense of diminishing the imbalance of the finish-machined workpiece.

The method of the invention affords the advantage of producing highly accurate results because objects subject to measurement which differ only slightly, that is, the reference workpiece and a work blank, are measured using the same measurement method and the position data of both objects as obtained by the measurements are compared, with only the difference between the position data obtained entering into the further calculation. As a result of the comparison of the position data, influences attributable to the measurement process and distortions of the underlying measurement values as well as zero-point deviations are compensated for and are accordingly unable to adversely affect the measurement accuracy considerably. Furthermore, as the reference workpiece and the work blank differ only within the scope of customary manufacturing tolerances, the comparison of the position data produces relatively small difference values so that inaccuracies occurring during measurement can have a very limited effect only.

At all events, practice has revealed that the method of the present invention produces very advantageous results. Minor circular errors occur on the finish-balancing machine for balancing the finish-machined workpieces. The measurement device is only required to measure linearly and produce repeatable measured values for like measuring positions on the reference workpiece and the work blank. Minor deviations of the absolute magnitude of the measured values have only a limited impact, so that an exact calibration of the measurement device as would be necessary for calculation of the workpiece volume is dispensable. Averaging over a plurality of measurement points adds to reducing the accuracy demands placed on the measurement device. Therefore, low-cost measurement devices may be used for the method, including, for example, three-dimensional measurement devices applying the laser light-section technique.

According to another proposal of the invention, the imbalance effect may be calculated by selecting discrete reference points of the reference partial surface, determining for each discrete reference point a partial imbalance effect on the basis of the deviation between the blank partial surface and the reference point, and determining the resulting imbalance effect by summation over the partial imbalance effects of all reference points. This enables the complexity of calculation to be reduced and the calculation operation to be simplified.

According to the invention, another advantageous further aspect of the method may include determining a nominal partial imbalance effect for each discrete reference point selected with an assumed small nominal deviation between the blank partial surface and the reference point and storing it as influencing coefficient of the reference point, and determining the real partial imbalance effect for each discrete reference point by multiplying the influencing coefficient of the reference point by the measured deviation between the blank partial surface and the reference point.

In this manner it is possible to calculate in advance for each discrete reference point the influencing factors of the reference points after measurement of the reference workpiece and storing the blank partial surface, so that the subsequent determination of the imbalance effects of work blanks only requires multiplication of the deviations measured on the reference points by the associated influencing coefficients. This reduces the computational effort subsequent to the measurement of the partial surfaces of work blanks substantially.

According to the invention, the nominal partial imbalance effect for each discrete reference point may be expressed as position deviation of the main inertia axis of an assumed workpiece having nominal mass distribution, for example, as eccentricity variations of the main inertia axis in the centering planes. The summation of the partial imbalance effects of the individual reference points then leads directly to the determination of a position of the main inertia axis which needs to be corrected only by adding an empirically determined offset.

The reference workpiece selected may be any work blank from a series of similar work blanks to be measured. Advantageously, however, the reference workpiece selected is a work blank on which the shape of the workpiece areas left unmachined is midway between the form errors caused by the manufacturing process. As a result, the deviations between the reference partial surface and the blank partial surfaces of the work blanks to be measured remain relatively small which contributes to determining the point of location accurately. Still further, it is advantageous for the reference workpiece to be manufactured from a work blank having a very small original imbalance.

To manufacture the reference workpiece, it is possible according to the invention to determine for a selected work blank the optimum position for the machining axis by mass centering and, if applicable, after the corresponding centering bores are applied, to subsequently machine the work blank to provide it with bearing surfaces concentric with the machining axis for placement in the measurement device. Preferably, the bearing surfaces may be provided with a hard, wear-resistant surface. The reference workpiece produced in this manner may be received with its bearing surfaces in a balancing machine, and the position of its main inertia axis may be measured. If the position of the main inertia axis differs from the imbalance reference axis determined by placement in the measurement device, the method of the invention provides for adding this position deviation or its corresponding imbalance to the computed position of the main inertia axis, for example, by including it in the offset to be added.

According to the present invention, an advantageous device for implementing the method comprises a reference workpiece, a measurement device having seats for receiving the reference workpiece or a work blank, with a sensing device for measuring the position of a plurality of points of unmachined surface areas of the reference workpiece and the work blank, and with an imbalance reference axis allocated to the sensing device, a computer having a data memory for storing measured position data of the plurality of points of the surface areas left unmachined as reference partial surface of the reference workpiece and as blank partial surface of the work blank, wherein the computer is configured to compute from the stored position data an imbalance effect relative to the imbalance reference axis which results from the deviation between blank partial surface and reference partial surface, to express the imbalance effect by the position of the main inertia axis of an assumed workpiece having nominal mass distribution, and to add an offset to the position of the main inertia axis which was determined empirically and stored on the basis of the actual imbalances, measured relative to the machining axis, of prior manufactured workpieces. According to the invention, the computer may also be configured to calculate points of location as penetration points of the machining axis through work blank end planes aligned orthogonally to the imbalance reference axis. Alternatively, the points of location of the work blank may also be calculated in a computer of a center-drilling machine for drilling centering bores defining the machining axis in the work blank.

Figure 2:
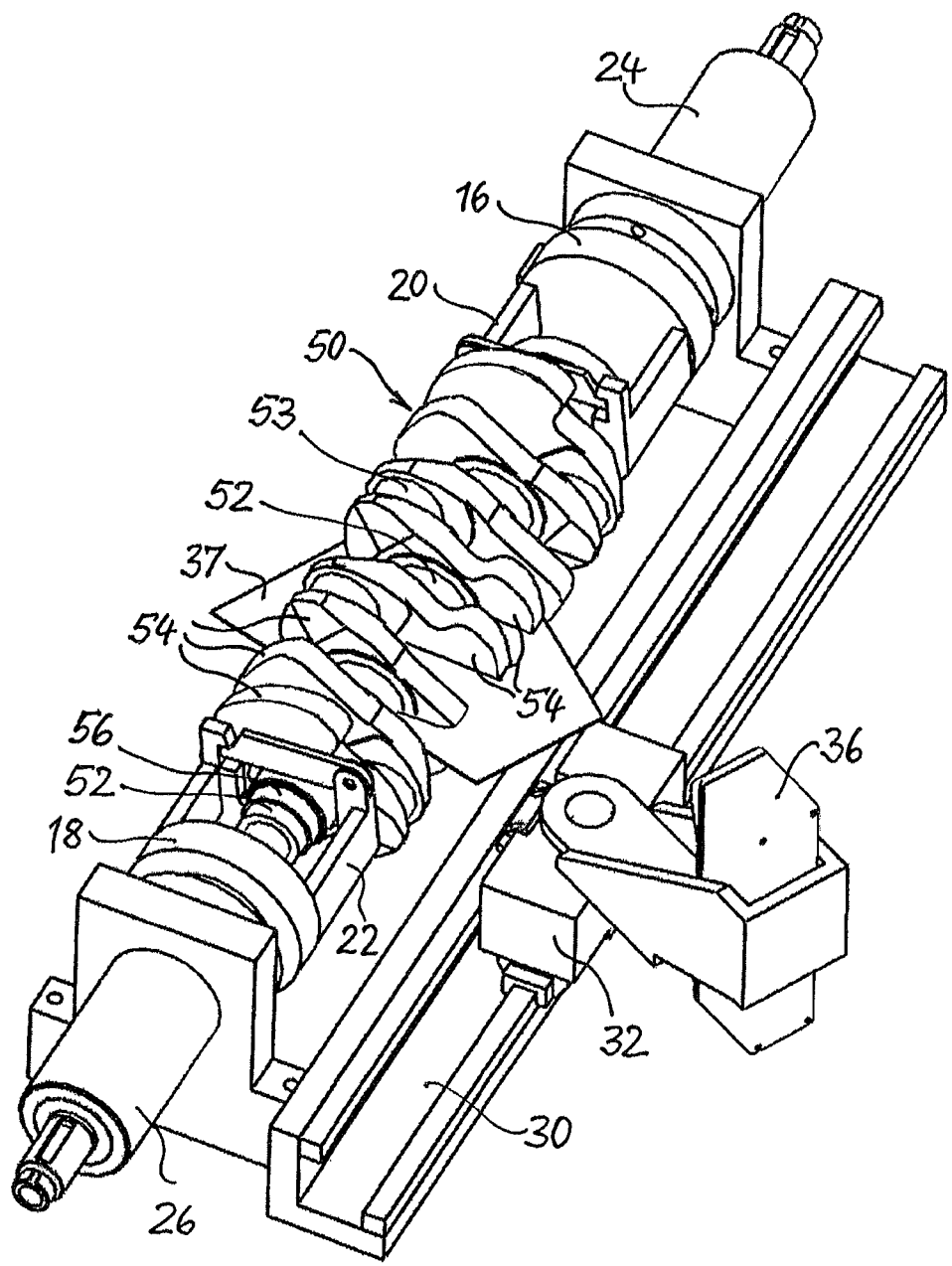
Figure 3:
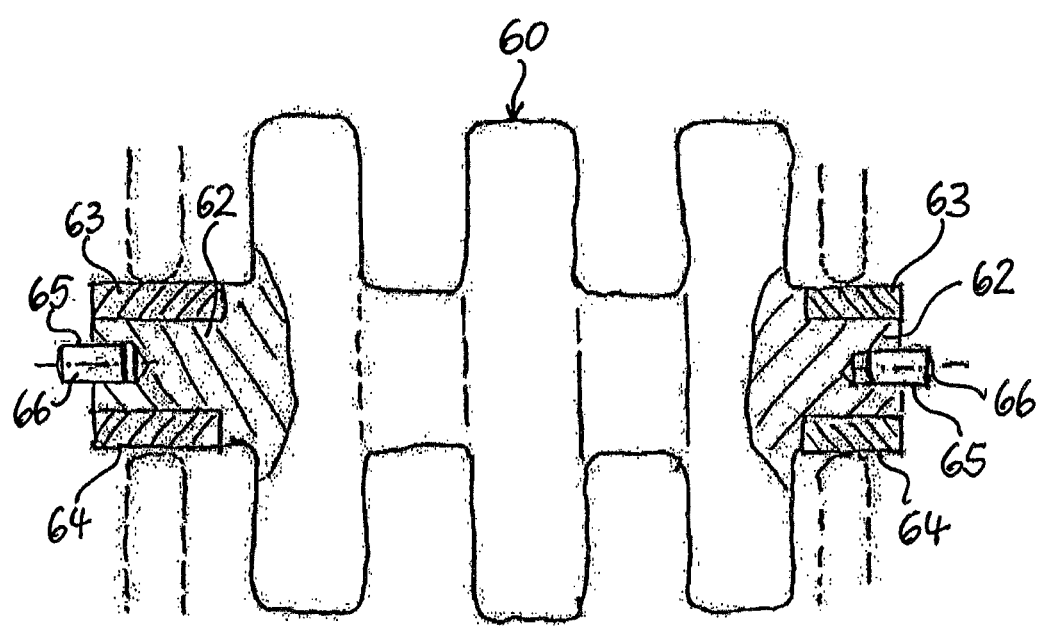

The present invention will be explained in greater detail in the following with reference to embodiments illustrated in the accompanying drawing. In the drawing, FIG. 1 is a view of a device according to the invention;

FIG. 2 is a view of a device of FIG. 1 during the process of measuring a reference workpiece; and FIG. 3 is a view of a reference workpiece.

The measurement device 10 illustrated in FIG. 1 includes two bearing housings 12, 14 arranged on a machine frame 11 in a spaced relationship to each other. Mounted for rotation in each bearing housing 12, 14 is a respective spindle carrying a spindle head 16, 18 in the form of a cylindrical disc at an end protruding from the bearing housing 12, 14 and facing the center of the machine frame 11. Holding fixtures 20, 22 provided with a clamping device for receiving the bearing journals or bearing flanges of a workpiece are arranged on the oppositely facing sides of the spindle heads 16, 18. The holding fixtures 20, 22 may be constructed in a variety of ways, including radially adjustable prisms or multi-jaw chucks or collets. Both spindles may be driven for rotation by means of motors 24, 26. The motors 24, 26 are coupled to one another mechanically or by an electric circuit such as allow synchronous movement. The motor 26 is provided with an angle-of-rotation sensor which senses the angular position of the spindle head driven by the motor 26. The spindles and spindle heads 16, 18 are aligned coaxially to each other.

Attached to the machine frame 11 adjacent to the bearing housings 12 is a guide rail 30 having a slide 32 mounted thereon for movement parallel to the common axis of the spindles. The slide 32 contains a drive motor enabling it to be moved longitudinally of the guide rail 30. A travel measurement system enables each slide position to be measured. Mounted on the slide 32 for pivotal movement about an axis 35 is a holder 34. The axis 35 extends in a plane normal to the axis of rotation of the spindles. Secured to the holder 34 is a sensing device 36 capable of optically sensing a body in three dimensions. The sensing device 36 operates according to the laser light-section method. Its measurement range 37 is illustrated by a surface area. A data transmission device 38 indicated by a double arrow connects the sensing device 36 to a programmable electronic computer 40 and a data memory 41 connected thereto. The data transmission device 38 may be of the wireless or wired type. In addition, the computer 40 is configured to control the motors 24, 26 as well as the drive of the slide 32 and the holder 34 and to receive and process the signal of the angle-of-rotation sensor of the motor 26.

In lieu of the rotary sensing device 36 shown, it is also possible according to the invention to mount on the slide 32 two or more stationary sensing devices which are directed at the workpiece in various directions simultaneously so that each sensing device may cover a different side of the workpiece. While this incurs higher cost, it affords the advantage of eliminating the need to repeat the pivot angle of the single sensing device, in addition to reducing the time required for the measurement.

In the measurement device 10 shown, the imbalance reference axis for calculating the imbalance effects is determined by the joint axis of rotation of the spindle heads 16, 18. The measurement range 37 of the sensing device 36 extends and moves preferably in a plane in which the axis of rotation is situated. However, an optical detection of the workpiece surfaces may also be performed without rotating the workpieces by the use of a plurality of sensors. In this arrangement, the imbalance reference axis may be formed by a straight line in which the centers or central planes of the measurement ranges of the sensors intersect.

FIG. 2 shows the measurement device 10 in the process of a measurement operation. Supported in the holding fixtures 20, 22 at the spindle heads 16, 18 is a reference workpiece 50 in the form of a crankshaft having bearing journals 52, crankpins 53 and crank webs 54. On such a crankshaft only the bearing journals 52 and the crankpins 53 are machined by stock removal. By contrast, the surfaces of the crank webs 54 are left unmachined. On the reference workpiece 50 only the bearing journals 52 at either end are machined and provided with cylindrical bearing surfaces 56 which serve to align the reference workpiece 50 in the holding fixtures 20, 22 of the measurement device 10, defining the imbalance reference axis for the reference workpiece 50. While machining the other bearing journals 52 and the crankpins 53 is not necessary, it would not be detrimental either.

The holding fixtures 20, 22 of the measurement device are designed in such a way that by seating therein the reference workpiece 50 with its bearing surfaces 56, the bearing axis of the reference workpiece 50 coincides with the axis of rotation of the spindles and spindle heads 16, 18, which axis defines the imbalance reference axis in the measurement device. The sensing device 36 enables the position of the bearing surfaces 56 and the cylindrical outer surfaces of the spindle heads 16, 18 to be measured, and a calculation and comparison of the position of their axes enables the central location of the reference workpiece 50 in its holding fixtures 20, 22 to be checked. If the check reveals a deviation of position between the imbalance reference axis and the bearing axis of the reference workpiece 50, it is possible to correct the position of the reference workpiece 50 by adjusting means provided on the holding fixtures 20, 22.

Once the reference workpiece 50 is received and clamped in place in the measurement device 10, the surface areas of the reference workpiece 50 remaining unmachined may be measured. For this purpose, the reference workpiece 50 is rotated slowly under control of the motors 24, 26. At the same time, the slide 32 operates to move the sensing device 36 in a first angular position, for example, the one shown in FIG. 2, along the reference workpiece 50 in a first direction, the measurement range 37 covering as this occurs the circumference and one side of the crank webs. The sensing device is subsequently pivoted into a second angular position which, for example, is symmetrical to the first angular position in relation to a radial plane, and is moved along the reference workpiece 50 in the opposite direction, covering aside from the circumference the other side of the crank webs. During these movements, the positions of a plurality of points of the surface areas of the crank webs 54 remaining unmachined are measured, and the measurement data is transmitted to the computer. The computer 40 calculates from the measurement data of the sensing device 36 and the associated angle-of-rotation data of the angle-of-rotation sensor three-dimensional position data and stores it in the data memory 41 as reference partial surface.

In the manner described, a work blank may be subsequently received and measured in the measurement device 10, the result of the measurement being stored in the data memory 41 as blank partial surface.

By referring to the stored position data of the reference partial surface and the blank partial surface, it is then possible to calculate the optimum position of each point of location for applying the centering bores on the work blank. To accomplish this, the software of the computer 40 makes a comparison between a plurality of discrete reference points of the reference partial surface and the blank partial surface, computing for each reference point the smallest deviation of the blank partial surface from the reference point. If, for example, the blank partial surface is raised relative to a reference point, the volume of the raised location may be computed as a small pyramid or spherical cap, for example, using the volume and the available work blank data to compute the mass, its center-of-gravity position and hence its imbalance partial effect, that is, the variation of the imbalance caused by the deviation of this particular location of the blank partial surface from the reference partial surface.

This calculation is performed identically for all reference points selected, and the imbalance partial effects identified in the process are then added up to a total imbalance effect. The total imbalance effect computed may be converted into the position of the main inertia axis of an assumed workpiece having the nominal mass distribution of the work blank.

The computed position of the mass inertia axis is, however, not suitable as yet as machining axis for the work blank since allowance has to be made for changes of the work blank due to the subsequent machining process, zero-point displacements and an imbalance of the reference workpiece, if any. Therefore, it has proven to be advantageous to add an offset to the position of the main inertia axis which was determined on the basis of imbalances, measured relative to the machining axis, of a plurality of workpieces of work blanks of like type, and stored in the computer. After the offset is added, the position of the machining axis is determined, enabling the positions of points of location to be calculated as penetration points of the machining axis through planes which are orthogonal to the imbalance reference axis and lie on the work blank end faces to be machined.

The position data of the points of location is transmitted to a center-drilling machine into which the work blank is loaded upon its removal from the measurement device to apply the centering bores at the locations computed for this purpose. The center-drilling machine is preferably seated in such a way that the spatial positions of the work blank relative to the axes receiving the measurement device and the center-drilling machine are identical.

FIG. 3 shows an example of a reference workpiece 60 manufactured from a selected work blank of a series of workpieces of like type. In selecting the work blank for the reference workpiece 60, it is advantageous for the dimensions of the work blank to lie midway within the applicable manufacturing tolerances to prevent the potential deviations of the work blanks to be compared to the reference workpiece 60 from becoming excessive. The reference workpiece 60 is only machined at the end bearing journals 62 since these are used for placement in the measurement device 10. All the remaining sections of the reference workpiece 60 are unmachined. For machining the bearing journals, the reference workpiece 60 was mass-centered in order to achieve a minimum original imbalance with reference to the machining axis. Considering that the machining axis of the reference workpiece 60 should coincide with the imbalance reference axis in the measurement device 10 as accurately as possible, it is suitable for the bearing journals 62 to have a wear-resistant surface to enable the reference workpiece 60 to be received in the measurement device 10 with good repeatability. Therefore, the prior turned bearing journals 62 have hardened rings 63 press-fitted thereon which are subsequently ground to the nominal diameter. The cylindrical bearing surfaces 64 of the rings may be detected in the measurement device 10 by the sensing device 36 and their centers in the centering planes be calculated in order to detect the position of the imbalance reference axis. Therefore, the imbalance reference axis for calculation of the imbalance effect of the individual work blanks to be compared to the reference workpiece 60 is permanently defined by the reference workpiece 60.

Following completion of the reference workpiece 60, its imbalance in relation to the machining axis is measured by means of a balancing machine.

The imbalance value measured then has to be entered into the calculation of the points of location, for example, by adding it to the offset. Alternatively, the reference workpiece 60 may also be balanced by removal of material in the area of the bearing journals and crankpins, which eliminates the need for considering an imbalance value in the calculation.

Advantageously, the reference workpiece 60 may also be used for zero-point adjustment of a center-drilling machine for drilling the work blanks. For this purpose, added provision may be made for coaxial cylindrical measuring surfaces 65 adjoining the hardened rings 63 at the ends of the bearing journals 62, which measuring surfaces enable better scanning by a dial gauge when setting up the center-drilling machine. The measuring surfaces 65 may be formed by dowel pins 66 press-fitted into cylindrical portions of centering bores.

It will be understood that the present invention is not limited to the embodiments described. Thus, for example, the workpiece may be held in the holding fixture of the measurement device so as to be stationary, and the sensing device may be guided around the stationary workpiece. In addition, in lieu of a single sensing device a plurality of sensing devices may be arranged around the workpiece and adapted to travel lengthwise of the stationary workpiece.

The invention claimed is:

1. A method of determining a machining axis of a rotary work blank, wherein the rotary work blank includes workpiece areas to be machined by stock removal and areas to be left unmachined, said method comprising the steps of:
receiving a reference workpiece in holding fixtures of a measurement device configured to measure the spatial position of workpiece surface points;
measuring, using the measurement device, the position of a plurality of points of surface areas of the reference workpiece to be left unmachined relative to an imbalance reference axis determined in the measurement device;

storing, in a data memory of a computer, the measured position data of the plurality of points of surface areas of the reference workpiece to be left unmachined as a reference partial surface;

removing the reference workpiece from the measurement device;

receiving a work blank in the holding fixtures of the measurement device;

measuring, using the measurement device, the position of a plurality of points of surface areas of the work blank to be left unmachined;

storing, in the data memory of the computer, the measured position data of the plurality of points of surface areas of the work blank to be left unmachined as a blank partial surface;

computing, from the stored position data, an imbalance effect relative to the imbalance reference axis resulting from the deviation between the blank partial surface and the reference partial surface;

expressing the imbalance effect by the position of the main inertia axis of a workpiece having a nominal mass distribution; and computing the machining axis by adding an offset to the position of the main inertia axis.

2. The method according to claim 1, further comprising expressing the position of the machining axis by the position of points of location, wherein the points of location are computed as penetration points of the machining axis through work blank end planes aligned orthogonally to the imbalance reference axis.

3. The method according to claim 1, further comprising determining the offset empirically with reference to imbalances, measured relative to the machined workpiece axis, of a plurality of workpieces manufactured with a machining axis determined according to the method, and storing the offset so determined in the computer.

4. The method according to claim 1, further comprising selecting discrete reference points of the reference partial surface, determining for each discrete reference point a partial imbalance effect on the basis of the deviation between the blank partial surface and the reference point, and determining the resulting imbalance effect by summation over the partial imbalance effects of all reference points.

5. The method according to claim 4, further comprising determining a nominal partial imbalance effect for each discrete reference point with an assumed small nominal deviation between the blank partial surface and the reference point and storing the nominal partial imbalance effect so determined as an influencing coefficient of the reference point, and determining the real partial imbalance effect for each discrete reference point by multiplying the influencing coefficient of the reference point by the measured deviation between the blank partial surface and the reference point.

6. The method according to claim 5, further comprising expressing the nominal partial imbalance effect for each discrete reference point as a position deviation of the main inertia axis of the workpiece having nominal mass distribution.

7. The method according to claim 1, further comprising manufacturing the reference workpiece by machining a work blank having a very small original imbalance.

8. The method according to claim 1, wherein the shape of the workpiece areas of the reference workpiece left unmachined is midway between the form errors caused by the manufacturing process.

9. The method according to claim 1, further comprising detecting the imbalance reference axis of the measurement device by measuring the position of bearing surfaces of the reference workpiece using the measurement device.

10. A device for determining the machining axis of a rotary work blank, wherein the rotary work blank includes workpiece areas to be machined by stock removal and areas to be left unmachined and has a known nominal mass distribution, comprising:

a reference workpiece;

a measurement device having holding fixtures for receiving the reference workpiece or a work blank, wherein the measurement device comprises a sensing device for measuring the position of a plurality of points of unmachined surface areas of the reference workpiece and the work blank, and an imbalance reference axis allocated to the sensing device;

a computer having a data memory for storing measured position data of the plurality of points of the surface areas left unmachined as a reference partial surface of the reference workpiece and as a blank partial surface of the work blank, wherein the computer is configured
to compute from the stored position data an imbalance effect relative to the imbalance reference axis resulting from the deviation between the blank partial surface and the reference partial surface,
to express the imbalance effect by the position of the main inertia axis of a workpiece having a nominal mass distribution, and
to compute the machining axis by adding an offset to the position of the main inertia axis.

11. The device according to claim 10, wherein the computer is configured to calculate points of location as penetration points of the machining axis through work blank end planes aligned orthogonally to the imbalance reference axis.

12. The device according to claim 10, wherein the detecting device includes a sensing device for contactless optical detection of three-dimensional shapes.

13. The device according to claim 10, wherein the holding fixtures are arranged on a rotary spindle, and wherein the sensing device of the measurement device is movable in the direction of the axis of rotation of the spindle.

14. The device according to claim 10, wherein the spindle includes a coaxial ring surface situated in the range of detection of the sensing device.

15. The device according to claim 10, wherein the sensing device is pivotal about an axis skew to the axis of rotation of the spindle.

16. The device according to claim 10, wherein the sensing device is arranged on a slide mounted for movement on a guide rail parallel to the imbalance reference axis.

17. The device according to claim 16, wherein the sensing device includes at least two sensors mounted on the slide and arranged such as to cover the workpiece from two opposed sides.

18. The device according to claim 10, wherein the reference workpiece includes bearing surfaces provided with a wear-resistant surface.

19. The device according to claim 10, wherein the reference workpiece includes on the end surfaces concentric measuring surfaces for determining the imbalance reference axis.

* * * * *